United States Patent
Livne et al.

(10) Patent No.: US 8,954,559 B2
(45) Date of Patent: Feb. 10, 2015

(54) SYSTEM AND METHOD FOR EXTENDING IMS SCIM / SERVICE BROKER TO ENABLE APPLICATION SERVERS USING MSCML TO EXECUTE ON CDMA WIN NETWORKS

(75) Inventors: Shlomo Livne, Ra'anana (IL); Dima Polsky, Jerusalem (IL); Vladimir Furman, Giv'at Ada (IL); Renana Seidman, Ra'anana (IL); Tali Ben-Meir, Ramat Gan (IL); Nadav Kadosh, Giv'atayim (IL); Tzach Livyatan, Tel Aviv (IL)

(73) Assignee: Oracle International Corporation, Redwood Shores, CA (US)

( * ) Notice: Subject to any disclaimer, the term of this patent is extended or adjusted under 35 U.S.C. 154(b) by 213 days.

(21) Appl. No.: 13/610,656

(22) Filed: Sep. 11, 2012

(65) Prior Publication Data
US 2014/0074998 A1    Mar. 13, 2014

(51) Int. Cl.
*G06F 15/173* (2006.01)
*H04L 12/801* (2013.01)
*G06F 21/35* (2013.01)

(52) U.S. Cl.
CPC .................................... *H04L 47/33* (2013.01)
USPC .......................................... 709/223; 719/314

(58) Field of Classification Search
None
See application file for complete search history.

(56) References Cited

U.S. PATENT DOCUMENTS

| | | | |
|---|---|---|---|
| 2007/0213078 A1* | 9/2007 | Shaheen | 455/466 |
| 2009/0010402 A1* | 1/2009 | Heimbecher | 379/88.21 |
| 2009/0187919 A1* | 7/2009 | Maes | 719/313 |
| 2010/0022248 A1* | 1/2010 | Lukacs | 455/445 |
| 2012/0302215 A1* | 11/2012 | Speks | 455/413 |

\* cited by examiner

*Primary Examiner* — Chris Parry
*Assistant Examiner* — Stephen Houlihan
(74) *Attorney, Agent, or Firm* — Meyer IP Law Group

(57) ABSTRACT

Systems and methods provide unified playing of announcements across different network interfaces. A system to extend an IMS SCIM to enable application servers using MSCML to play announcements to execute on WIN (CDMA) networks include an application server, including IMS applications. The system includes a SCIM to manage communication between call parties and the applications. In a CDMA network, which an open dialogue the SCIM is configured to respond to the IMS applications that then can play the announcement, receive a second message which indicates the announcement to play from the IMS applications, buffer the announcement indicated, and respond with a message to the IMS applications as if the announcements have been played.

18 Claims, 7 Drawing Sheets

SYSTEM AND METHOD FOR EXTENDING IMS SCIM / SERVICE BROKER TO ENABLE APPLICATION SERVERS USING MSCML TO EXECUTE ON CDMA WIN NETWORKS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to telecommunications networks and in particular to a system and method of extending a service broker to enable application servers to execute on additional telecommunications networks.

BACKGROUND

SCIM/Service Broker enable operators to add multiple applications to serve a single session. IMS Application Servers use Media Server Control Markup Language (MSCML) to play announcements over MRF to subscribers. However, Wireless Intelligent Network (WIN2—IS826/IS771) provides a set of dedicated operations for user interaction (playing announcements).

A common method to enable IMS applications utilizing MSCML to play announcements over a CDMA network is to anchor calls, that is, to transfer the call from the IN domain to the IMS domain and then connect to the MRF. This method is not optimal as it requires additional resources, and, in some cases, requires hauling the calls from one location to the MRF location which incurs additional costs for operators.

FIGS. 1 and 1A show a sequence diagram of an example SCIM with anchoring. As shown in FIGS. 1 and 1A, APP1 100 is configured to connect the caller A 102 to a media resource at the beginning of a call. In this example, A 102 is connected via a CDMA network and needs to be connected to a media resource function (MRF 104) in order to receive the announcement. The call is initiated at 106 with an OriginatingRequest message to SCIM 108. INVITE messages are exchanged 110 with APP1 100, and APP1 indicates that it needs to connect A 102 to a resource function (to play an announcement). A 102 is then connected from the mobile switching center (MSC) to a media gateway (MG) and a media gateway control (MGC 112) which can convert from TDM/ISUP to RTP/SIP (IMS). At 114, an INVITE message is sent from MGC 112 to SCIM 108 which includes the correlation information from SCIM 108. SCIM sends INFO (116) to APP1 marking that a voice path has been established toward the MRF, APP1 100 sends an INFO message 118 to the SCIM 108 identifying which message should be played using MSCML. At 120, the message is played to caller A and any needed information (e.g., digits) is collected. At 122, a WIN Disconnect Resource is sent to disconnect A from the resource function and at 124 the connections to the MG and MGC 112 and MRF 104 are closed. As shown above, this method of anchoring WIN/TDM into IMS is inefficient, and requires substantial processing.

Additionally, some SCIM/Service Broker platforms provide IMS applications, a standard API such as JSR309 "Media Server Control API" to access IMS MRF (via MSCML) and for non IMS applications, a different API to access the WIN operations (this overcomes the need to anchor calls); however, in these cases, there is a need to develop an application twice—once for IMS (SIP and MSCML) and once for WIN, which incurs additional costs at development time, as well as additional maintenance costs.

SUMMARY

In accordance with various embodiments, systems and methods that provide unified playing of announcements across different network interfaces are provided. A system to extend an IMS SCIM to enable application servers using MSCML to play announcements to execute on WIN (CDMA) networks can include at least one application server, executing on one or more microprocessors, including one or more IMS applications. The system can further include a SCIM which is operable to manage communication between one or more call parties and one or more applications. In a CDMA network, in case there is an open dialogue (open transaction with between the MSC and SCIM), when the one or more IMS applications connect a call party to a resource function, the SCIM is configured to respond to the one or more IMS applications that then can play the announcement, receive a second message which indicates the announcement to play from the one or more IMS applications, buffer the announcement indicated, and respond with a message to the IMS applications as if the announcements have been played. Once the IMS Application decides to disconnect the call from the resource function and continue/release the call the collected announcements are added on the operation response. In a CDMA network, in case there is no open dialogue (open transaction with between the MSC and SCIM), when one or more IMS applications connect a call party to a resource function, the SCIM is configured to respond to the one or more IMS applications that they can play the announcement, receive a second message which indicates the announcement to play from the one or more IMS applications, send a command to the MSC to play the announcements once a response is received, respond with a message to the IMS applications that the announcements have been played,

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Figure 1:
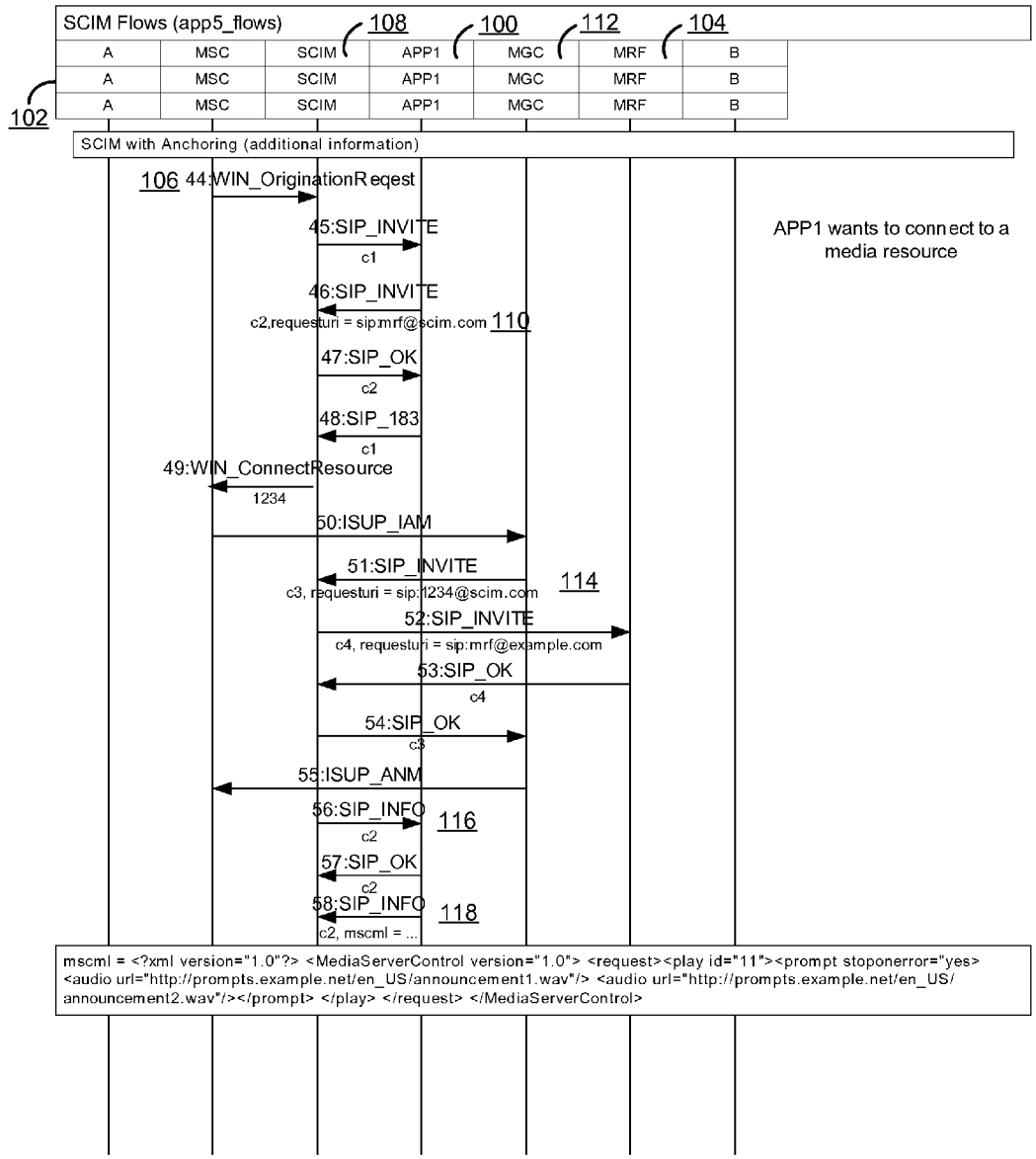
FIGS. 1 and 1A show a sequence diagram of an example SCIM with anchoring.
Figure 1A:
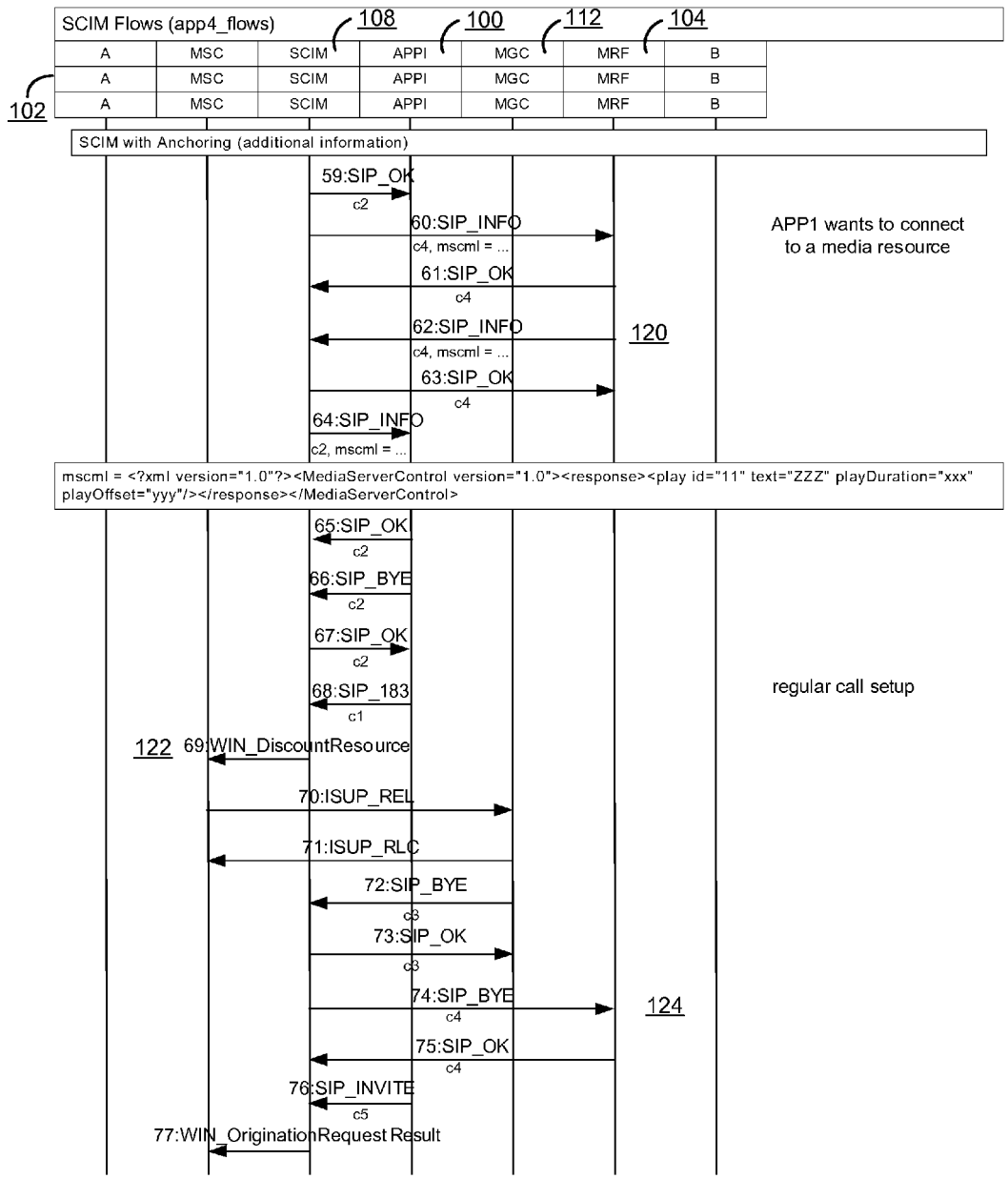
Figure 2:
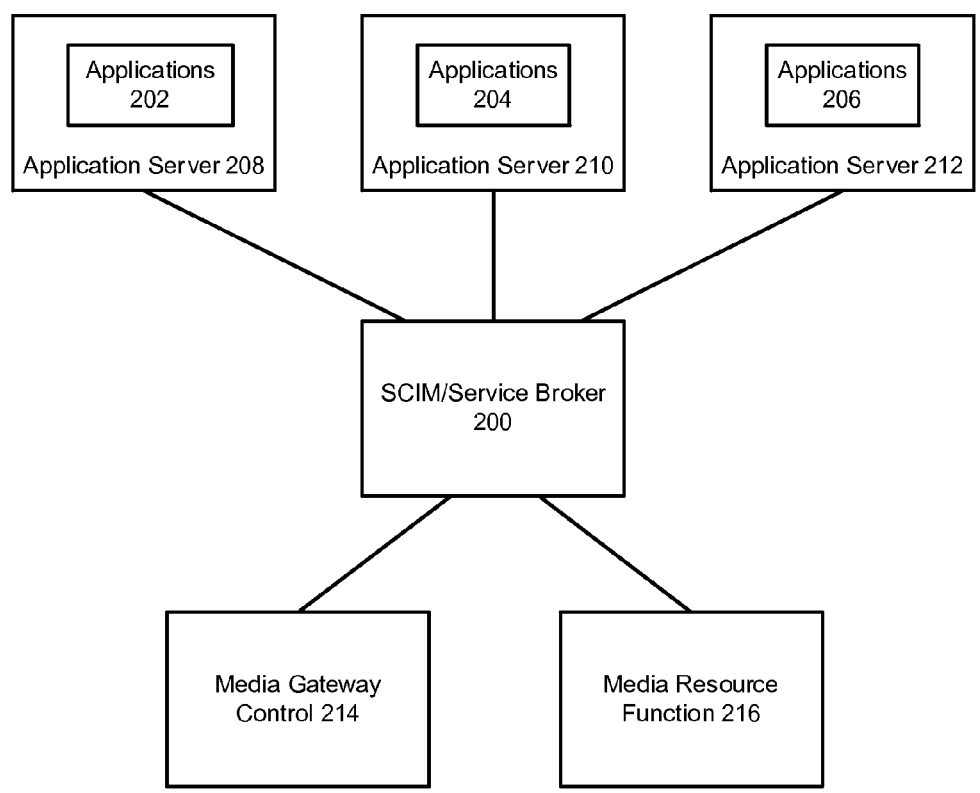
FIG. 2 shows a Service Control Interaction Management (SCIM)/Service Broker.

FIG. 2 shows a Service Control Interaction Management (SCIM)/Service Broker. The SCIM 200 can orchestrate, or chain together, multiple applications 202-206 across different application servers 208-212. Each of the plurality of application servers can include a plurality of applications. SCIM orchestration is done according to the signaling from the network. The SCIM 200 can connect to a media gateway controller (MGC) 214 that with a media gateway (MG) can convert TDM/ISUP and RTP/SIP (IMS). Additionally, SCIM 200 can connect call parties to a media resource function (MRF) 216 to enable applications 202-206 to play announcements and collect information from the callers.

Figure 3:
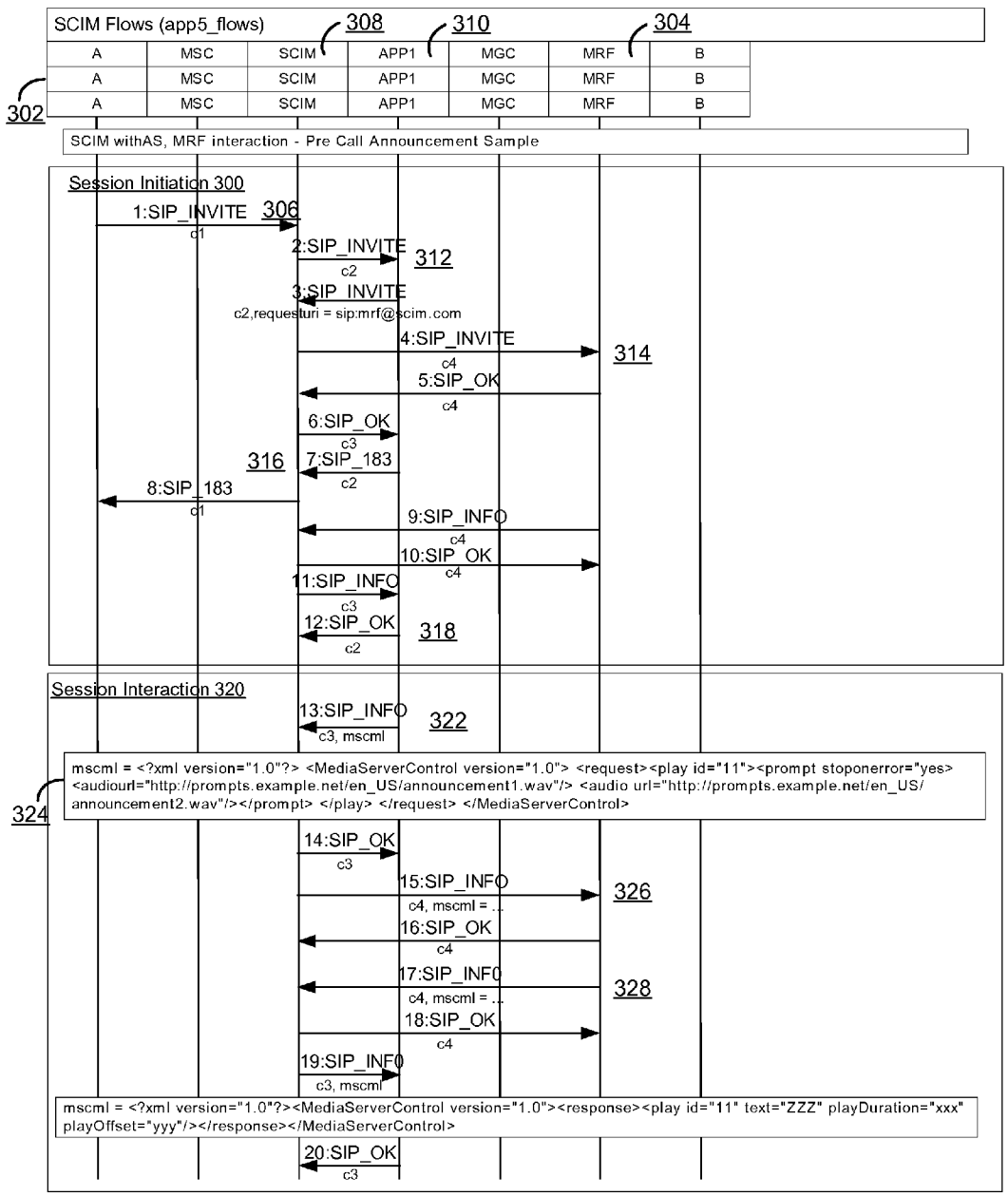
FIGS. 3 and 3A show a sequence diagram of playing an announcement in an IMS network.
Figure 3A:
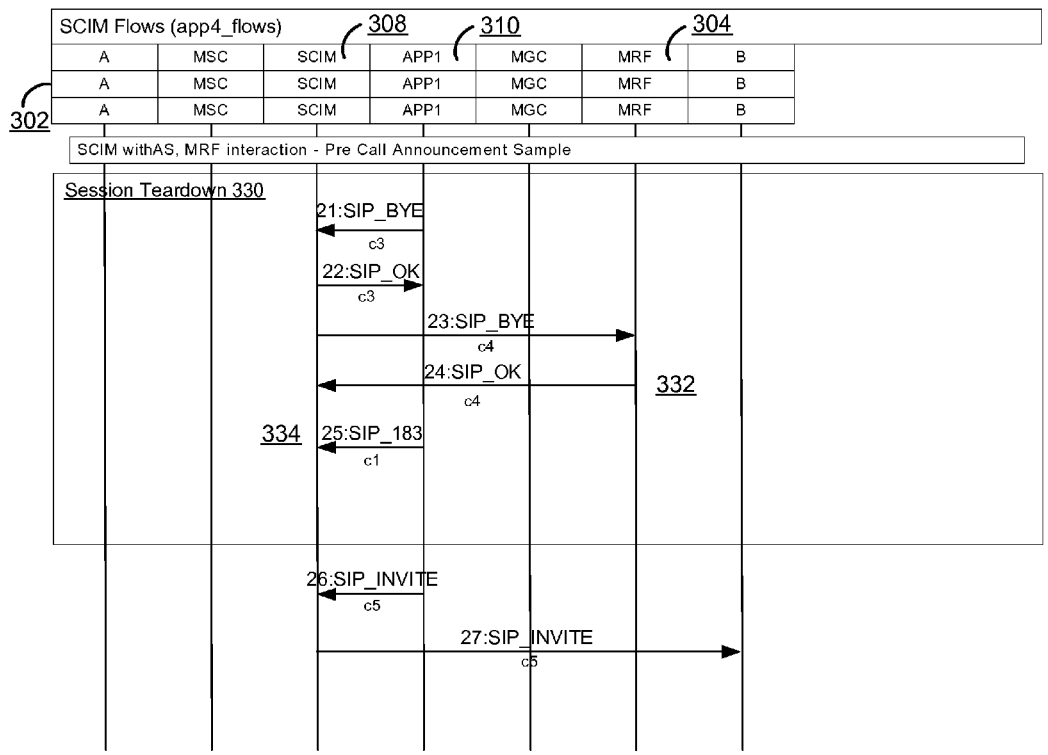

FIGS. 3 and 3A show a sequence diagram of playing an announcement in an IMS network. As shown in FIGS. 3 and 3A, an IMS application server plays a pre-call announcement using MSCML. Session Initiation 300 includes the steps of connecting the caller A 302 to MRF 304. At 306, an INVITE message is sent from A 302 to SCIM 308. The SCIM connects to APP1 310. APP1 310 sends an INVITE message 312 indicating that it wants to connect A 302 to a media resource (MRF 304). The SCIM sends an INVITE (314) to the MRF 304 and send to caller A (302) the SDP information of the MRF at 316. APP1 310 is then notified 318 that the connection to caller A 302 is open and it can start to play announcements. Session Interaction 320 includes the steps of playing the announcement to A 302 and receiving any response. At 322, an INFO message is sent from APP1 310 to SCIM 308 which includes MSCML data 324 indicating which announcement should be played. The instructions are passed at 326 to the MRF which plays the announcement and if needed collects information, and then a response is returned 328 along with any information that was collected from A (e.g., digits). During the session teardown 330, the connection to the MRF 304 is cleared 332 and the voice path to caller A 302 is disconnected 334.

Figure 4:
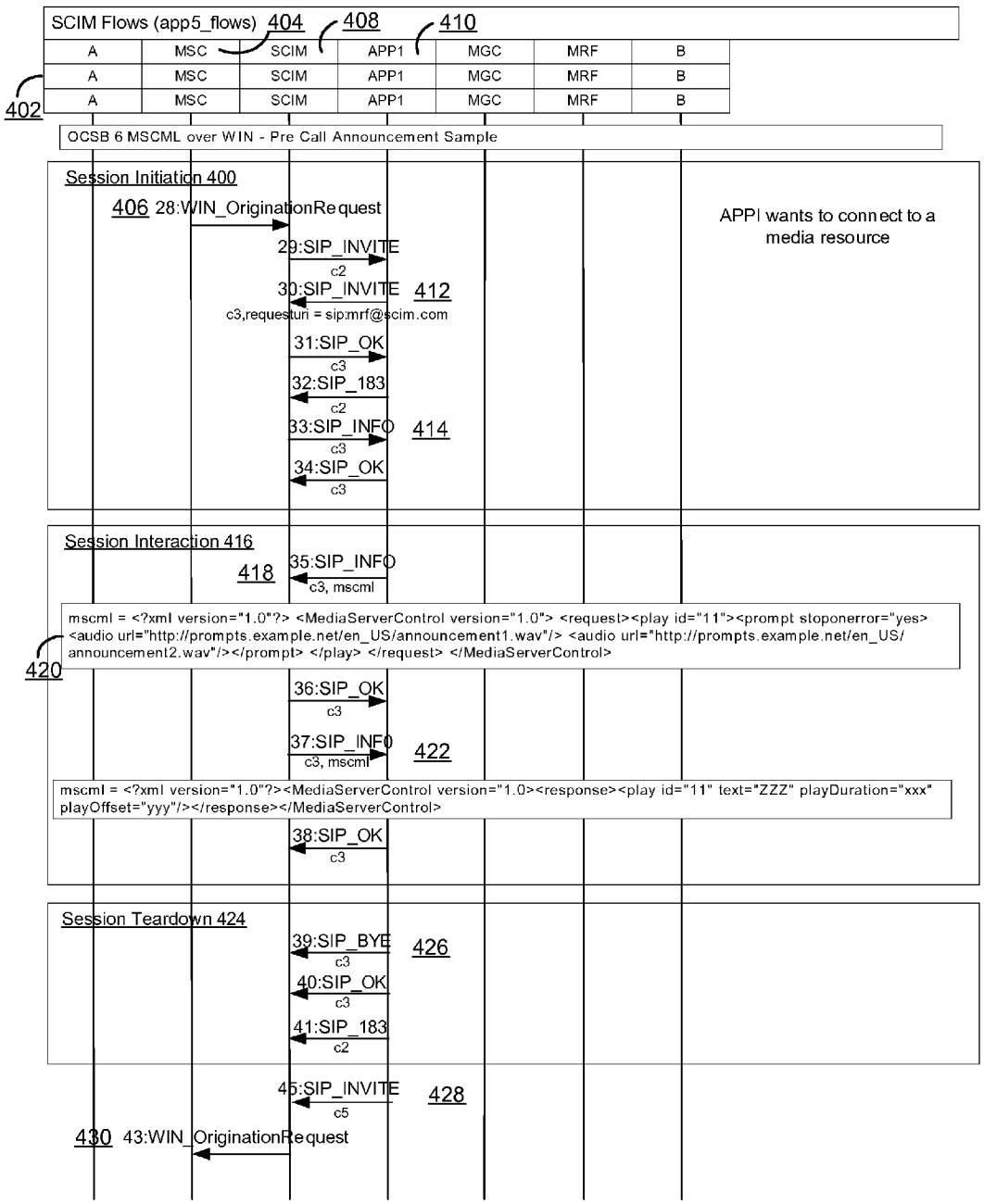
FIG. 4 shows a sequence diagram of playing an announcement in a WIN (CDMA) network, in accordance with an embodiment of the invention.

FIG. 4 shows a sequence diagram of playing an announcement in a WIN (CDMA) network, in accordance with an embodiment of the invention. As shown in FIG. 4, Session Initiation 400 includes the steps of simulating to the application APP1 410 as if the caller is connected to the resource function. At 406, an OriginationRequest message is sent to the SCIM 408. SCIM 408 sends an INVITE to APP1 410 which replies with an INVITE 412 indicating it is configured to connect A 402 to a resource function. SCIM 408 then sends an INFO message 414 to APP1 410 indicating that the announcement can be played. Session Interaction 416 includes the steps of playing announcements from the point of view of the application and buffering the announcements in the SCIM. A play request 418 including MSCML code 420 identifying the announcement to be played is sent from APP1 410 to SCIM 408. At this stage in processing, the SCIM cannot play the announcement to the caller A 402. Instead, the SCIM buffers the announcement and sends an INFO message 422 indicating to APP1 410 that the message has been played to caller A 402. In the Session Teardown 424, APP1 410 disconnects A from the resource function. APP1 then send an INVITE 428 to continue the call this indicates to the SCIM 408 that all of the announcements APP1 410 was configured to play to caller A 402 have been requested and buffered. At 430, a WIN OriginationRequestResult message is sent to the MSC 404 to continue the call and play the announcements requested by APP1 410.

In accordance with an embodiment of the invention, when a pending MSC request, such as an OriginationRequest, AnalyzedInformation, etc., exists, any play message requests (for example, play request 418), e.g., SIP INFO with MSCML, received from an application or other network entity are buffered and acknowledged automatically by the SCIM with a SIP INFO (for example, as shown at 422). These buffered announcements can then be later embedded in the response message. Although a single application is shown requesting that a single announcement be played to a single subscriber in the example shown in FIG. 4, a plurality of announcements from a plurality of applications can be buffered and then played back to one or more call parties. The example shown in FIG. 4 was selected for brevity and clarity and is not intended to be limiting.

If there is no pending MSC request, and a call is active, then play message requests, e.g., SIP INFO with MSCML, are translated to CallControlDirective requests. CallControlDirectiveResult messages are translated into play message response, e.g., SIP INFO with MSCML.

Figure 5:
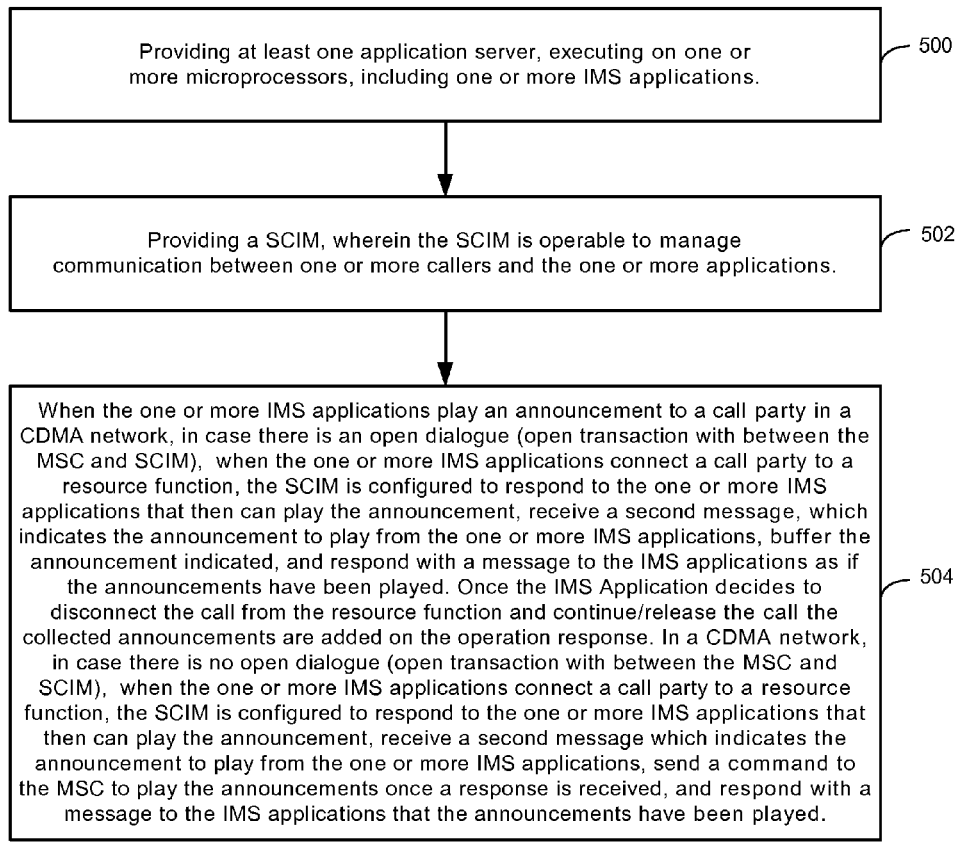
FIG. 5 shows a method of extending IMS SCIM/Service Broker to enable application servers using MSCML to play announcements to execute on WIN (CDMA) networks, in accordance with an embodiment of the invention.

FIG. 5 shows a method of extending IMS SCIM/Service Broker to enable application servers using MSCML to play announcements to execute on WIN (CDMA) networks, in accordance with an embodiment of the invention. At step 500 at least one application server, executing on one or more microprocessors, is provided. The at least one application server can include one or more IMS applications that are using MSCML to play announcements. At step 502, a SCIM is provided. The SCIM is operable to manage communication between one or more call parties and the one or more applications. At step 504, when the one or more IMS applications play an announcement to a call party, in a CDMA network, in case there is an open dialogue (open transaction with between the MSC and SCIM), when the one or more IMS applications connect a call party to a resource function, the SCIM is configured to respond to the one or more IMS applications that they can play the announcement, receive a second message which indicates the announcement to play from the one or more IMS applications, buffer the announcement indicated, and respond with a message to the IMS applications as if the announcements have been played. Once the IMS Application decides to disconnect the call from the resource function and continue/release the call the collected announcements are added on the operation response. In a CDMA network, in case there is no open dialogue (open transaction with between the MSC and SCIM), when the one or more IMS applications connect a call party to a resource function, the SCIM is configured to respond to the one or more IMS applications that then can play the announcement, receive a second message which indicates the announcement to play from the one or more IMS applications, send a command to the MSC to play the announcements once a response is received, respond with a message to the IMS applications that the announcements have been played.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system to extend an Internet Protocol Multimedia Subsystem (IMS) Service Control Interaction Manager (SCIM) to enable application servers to execute on Wireless Intelligent Network (WIN) (Code Division Multiple Access CDMA) networks, comprising:
   one or more microprocessors;
   at least one application server, executing on said one or more microprocessors, including one or more IMS applications using Media Server Control Markup Language (MSCML) to play announcements;
   a SCIM, wherein the SCIM is operable to manage communication between one or more call parties and the one or more applications; and
   wherein when a CDMA call is active and there are pending requests for the one or more IMS applications to connect a call party to a resource function, the SCIM is configured to,
      send a first message to the one or more IMS applications that then can request to play an announcement,
      receive a second message from the one or more IMS applications which indicates the announcement to play to the call party using MSCML,
      buffer the announcement indicated in MSCML of the second message,
      send a third message to the one or more IMS applications indicating that the announcement has been played before playing the announcement, and
      subsequently play the announcement to the call party.

2. The system of claim 1, wherein the IMS SCIM is further configured to play the announcement to the call party after all the IMS applications have responded and the CDMA call should be either continued or released.

3. The system of claim 2, wherein when the one or more IMS applications play a message to a call party, the SCIM is further configured to
   play a plurality of buffered announcements to the call party after all the IMS applications have responded and the CDMA call should be either continued or disconnected.

4. The system of claim 1, wherein if the CDMA call is active and there are no pending requests, then the SCIM is configured to translate play message requests into CallControlDirective requests.

5. The system of claim 4, wherein if the CDMA call is active and there are no pending requests, then the SCIM is configured to translate CallControlDirectiveResult messages into play message responses.

6. The system of claim 1 wherein the SCIM is configured to play a plurality of messages to a plurality of call parties.

7. A method to extend an Internet Protocol Multimedia Subsystem (IMS) Service Control Interaction Manager (SCIM) to enable application servers to execute on Wireless Intelligent Network (WIN) (Code Division Multiple Access CDMA) networks, comprising:
   providing at least one application server, executing on one or more microprocessors, including one or more IMS applications using Media Server Control Markup Language (MSCML) to play announcements;
   providing a SCIM, wherein the SCIM is operable to manage communication between one or more call parties and the one or more applications; and
   wherein when a CDMA call is active and there are pending requests for the one or more IMS applications to connect a call party to a resource function, the SCIM performs steps comprising,
      sending a first message to the one or more IMS applications that then can request to play an announcement,
      receiving a second message from the one or more IMS applications which indicates the announcement to play to the call party using MSCML,
      buffering the announcement indicated in MSCML of the second message,
      sending a third message to the one or more IMS applications indicating that the announcement has been played before playing the announcement, and
      subsequently playing the announcement to the call party.

8. The method of claim 7 wherein:
   subsequently playing the announcement to the call party comprises playing the announcement to the call party after all the IMS applications have responded and the CDMA call should be either continued or released.

9. The method of claim 8, wherein when the one or more IMS applications play a message to a call party, the method comprises:
   playing a plurality of buffered announcements to the call party.

10. The method of claim 7, wherein if the CDMA call is active and there are no pending requests, then the SCIM translates play message requests into CallControlDirective requests.

11. The method of claim 10, wherein if the CDMA call is active and there are no pending requests, then the SCIM translates CallControlDirectiveResult messages into play message responses.

12. The method of claim 7 wherein the SCIM plays a plurality of messages to a plurality of call parties.

13. A non-transitory computer readable storage medium including instructions stored thereon for extending an Internet Protocol Multimedia Subsystem (IMS) Service Control Interaction Manager (SCIM) to enable application servers to execute on Wireless Intelligent Network (WIN) (Code Division Multiple Access CDMA) networks, which instructions, when executed by a computer, cause the computer to perform steps comprising:

providing at least one application server, executing on one or more microprocessors, including one or more IMS applications using MSCML to play announcements;

providing a SCIM, wherein the SCIM is operable to manage communication between one or more call parties and the one or more applications; and wherein when a CDMA call is active and there are pending requests for the one or more IMS applications to connect a call party to a resource function, the SCIM performs steps comprising, sending a first message to the one or more IMS applications that then can request to play an announcement, receiving a second message from the one or more IMS applications which indicates the announcement to play to the call party using MSCML, buffering the announcement indicated in MSCML of the second message, sending a third message to the one or more IMS applications indicating that the announcement has been played before playing the announcement, and subsequently playing the announcement to the call party.

14. The non-transitory computer readable storage medium of claim 13, wherein:

subsequently playing the announcement to the call party comprises playing the announcement to the call party after all the IMS applications have responded and the CDMA call should be either continued or released.

15. The non-transitory computer readable storage medium of claim 14, wherein the steps further comprise:

playing a plurality of buffered announcements to the call party.

16. The non-transitory computer readable storage medium of claim 13, wherein if the CDMA call is active and there are no pending requests, then the SCIM translates play message requests into CallControlDirective requests.

17. The non-transitory computer readable storage medium of claim 16, wherein if the CDMA call is active and there are no pending requests, then the SCIM translates CallControlDirectiveResult messages into play message responses.

18. The non-transitory computer readable storage medium of claim 13 wherein the SCIM plays a plurality of messages to a plurality of call parties.

* * * * *

UNITED STATES PATENT AND TRADEMARK OFFICE
CERTIFICATE OF CORRECTION

| | | |
|---|---|---|
| PATENT NO. | : 8,954,559 B2 | Page 1 of 1 |
| APPLICATION NO. | : 13/610656 | |
| DATED | : February 10, 2015 | |
| INVENTOR(S) | : Shlomo Livne et al. | |

It is certified that error appears in the above-identified patent and that said Letters Patent is hereby corrected as shown below:

Title page 1, item (54), column 1, line 1, delete "SYSTEM AND METHOD FOR" and insert -- SYSTEM AND METHOD OF --, therefor.

In the specification

Column 1, line 1, delete "SYSTEM AND METHOD FOR" and insert -- SYSTEM AND METHOD OF --, therefor.

In the claims

Column 6, line 18, Claim 6, delete "claim 1" and insert -- claim 1, --, therefor.

Column 6, line 48, Claim 8, delete "claim 7" and insert -- claim 7, --, therefor.

Column 6, line 66, Claim 12, delete "claim 7" and insert -- claim 7, --, therefor.

Column 8, line 24, Claim 18, delete "claim 13" and insert -- claim 13, --, therefor.

Signed and Sealed this
Twenty-fourth Day of May, 2016

Michelle K. Lee
*Director of the United States Patent and Trademark Office*